(12) United States Patent
Herscheid et al.

(10) Patent No.: US 6,773,686 B1
(45) Date of Patent: Aug. 10, 2004

(54) PROCESS FOR THE PURIFICATION AND CONCENTRATION OF RADIODIDE ISOTOPES

(75) Inventors: Jacobus D. M. Herscheid, Nieuw Vennep (NL); Frits Peter Moet, Alkmaar (NL)

(73) Assignee: Mallinckrodt Inc., St. Louis, MO (US)

( * ) Notice: Subject to any disclaimer, the term of this patent is extended or adjusted under 35 U.S.C. 154(b) by 0 days.

(21) Appl. No.: 09/889,538

(22) PCT Filed: Jan. 21, 2000

(86) PCT No.: PCT/US00/01824

§ 371 (c)(1),
(2), (4) Date: Jul. 18, 2001

(87) PCT Pub. No.: WO00/43110

PCT Pub. Date: Jul. 27, 2000

(30) Foreign Application Priority Data

Jan. 22, 1999 (EP) .......................................... 99200182

(51) Int. Cl.$^7$ ................................................ C01B 7/00
(52) U.S. Cl. ........................... 423/2; 423/249; 423/500; 423/503
(58) Field of Search ............................. 423/249, 2, 500, 423/503

(56) References Cited

U.S. PATENT DOCUMENTS

| | | | |
|---|---|---|---|
| 3,989,484 A | * | 11/1976 | Hamrin, Jr. et al. |
| 4,600,660 A | * | 7/1986 | Klatt et al. |
| 5,102,651 A | * | 4/1992 | Wilbur et al. ............... 548/542 |
| 5,661,038 A | * | 8/1997 | Brenna et al. ............... 436/173 |

OTHER PUBLICATIONS

Arino, et al., "Separation and purifcation of radioiodine using platinum–coated copper granules" Int. J. Appl. Radiat. Isot. 1976, no month, 27(11), pp. 637–641.*

* cited by examiner

*Primary Examiner*—Steven Bos

(57) ABSTRACT

Process for the purification and concentration of isotopes which isotopes are dissolved in a dilute acidic solution and adsorbed on an (optionally) activated surface of a $d^{10}$-metal whereby the isotopes are selectively desorbed by elution whereby in situ reduction of oxidation products is achieved and an apparatus for performing said process.

21 Claims, 4 Drawing Sheets platinum powder < 200 mesh, magnification 100 x platinum sponge < 20 mesh, magnification 100 x

PROCESS FOR THE PURIFICATION AND CONCENTRATION OF RADIODIDE ISOTOPES

The invention relates to a process for the purification and/or concentration of (radio)isotopes, a process for the purification of iodine isotopes, a process for obtaining a transportable form of isotopes and an apparatus therefore and a transportable form of isotopes.

Radiopharmaceuticals are used for diagnostic and therapeutic application in Nuclear Medicine. During the last decade, internal radiotherapy has become increasingly popular, particularly in the fields of oncology, endocrinology and rheumatology. Isotopes with a long half-life (>4 days) e.g. iodine-131 and strontium-89, have been in use for this kind of therapy. It is important that these isotopes emit α- and/or β-particles in order to achieve the desired absorbed radiation dose in target tissue (e.g. tumour tissue).

Diagnostic isotopes in general have a short half-life(<4 days) with a γ-decay (e.g. technetium-99 and iodine-123), and are used for localisation and visualisation of tumours, inflammation or metabolic diseases.

Radiopharmaceuticals are compounds that play an active role in the determination of biological processes by coupling to peptides or proteins. These compounds are labelled with an appropriate radio-isotope. The biologically active part is often responsible for seeking the target tissue. Diagnostic γ-emitting isotopes can be detected with a γ-camera to visualise the target tissue (e.g. tumour). The radiation dose for the patient will be kept as low as reasonable (ALARA= As Low As Reasonably Achievable principle). For therapeutical use, a high and selective uptake and long retention of the isotopes in the target is important in order to destroy the diseased tissue.

There is a large number of iodine isotopes which are used in nuclear medicine, especially for thyroid studies, where the (radio) iodine reacts with the tyrosine. Table 1 shows an overview of the most frequently used radio-iodinated compounds.

TABLE 1

Frequently used radio-iodinated compounds.

| isotope | labelled molecule | target organ |
| --- | --- | --- |
| Iodine-123/131 | Hippuran | kidney |
| Iodine-123 | Iomazenyl | brain |
| Iodine-123/131 | Sodium iodide | thyroid |
| Iodine-123 | MIBG | adrenals (marrow) |
| Iodine-131 | Norcholesterol | adrenals (cortex) |

Radioiodine is an important radioisotope in nuclear medicine, for various applications (SPET, PET, and radioimmunotherapy). This wide-spread use in nuclear medicine implies meeting specifications, such as radionuclidic purity (e.g. low level of $^{121}$Te which is a by-product in the production of $^{123}$I) and radiochemical purity (e.g. absence of radioiodine containing impurities such as iodate or periodate compounds but also in the absence of $^{121}$Te, which is a by-product in the production of $^{123}$I).

Fulfilment of these requirements are a 'conditio sine qua non' for an efficient production (high labelling yield) of radioiodinated pharmaceuticals. In earlier developed methods such as anion-exchange chromatography (Good et al., 1958, Harper et al., 1963) traces of (oxygenated) radioiodine containing impurities were not completely removed due to insufficient selectivity. The use of a distillation-process whether wet (Acerbi et al., 1975) or dry (Weinreich et al., 1996), is not only less practical, but in the case of no-carrier-added radioiodide, may also lead to hazardous and unwanted generation of impurities due to heating. Sometimes in these processes, presence of radioiodide impurities can be suppressed by addition of traces of reducing agents.

A concentration-purification process based on the adsorption/desorption features of radioiodide for platinum (Case et al., 1966, Kondo et al., 1977) has been described previously. In this method, radioiodide from an acidified solution was adsorbed, on a platinum surface (e.g. foil or felt), that was pre-treated with hydrogen-gas, and desorbed electrochemically (Toth, 1961), or by heating in a sulphite-containing alkaline-solution (Kondo et al., 1977). Adsorption and desorption were not quantitative (ca 80% and 60%, respectively), while the whole process is laborious and time consuming.

It is a goal of the present invention to provide a swift and reliable method for the purification of radioiodine. This method must be able to fulfil the high requirements for radiochemical purity as well as radionuclidic purity. The method should have a large capacity, contain little or no contamination with tellurium compounds, have a stable and reproducible yield and provide the radioisotope in the iodide form.

The method should also be capable of providing the radioiodide in a concentrated form, thus providing for a more efficient handling. Hence it is another goal of the invention to provide a method for the concentration of radioiodine.

It is also another goal of the present invention to provide for a method which is suitable as production-method, and is able to provide reductive properties for removing radio-chemical impurities of the radioiodide, thereby obtaining a high recovery (>95%).

Accordingly, the invention comprises a process for the purification of radioisotopes wherein the isotopes are dissolved in a dilute acidic solution and adsorbed on a surface (optionally activated) of a $d^{10}$-metal whereby the isotopes are selectively desorbed by elusion with an eluent in the presence of hydrogen.

It is possible that the terms iodide and iodine may be used in an interchangeable manner. This may be attributed to the mechanism of the adsorption-desorption process which is not fully elucidated. This does not detract from the concept and scope of the present invention.

Alterations on adsorption-material, as well as elution-conditions result in different embodiments of the invention and in an efficient process in which radiochemical pure radioiodide is obtained in a reproducible yield (>95%) with a high-recovery. A high yielding procedure comprising steps of the invention is one wherein a column is filled with the iodine absorbing metal such as platinum. The metal is optionally activated by purging with hydrogen gas. Subsequently an acidic solution containing the radioiodine is brought on the column and the radioiodine is absorbed on the metal. When platinum is used, the column has also reductive properties, thus reducing possible oxidation products of iodide such as iodate or periodate to iodine. After the iodide is absorbed, the column is rinsed to remove other impurities present in the load solution in such way that the iodide remains absorbed on the metal. Subsequently, the iodide is eluted in the form of iodine with a basic solution, optionally containing other components such as hydrogen. The purified iodine is collected and ready for further use.

By eluting the column with a suitable eluent the iodine is obtained in a concentrated form. One aspect of the invention therefore is a process for the concentration of radioisotopes wherein the isotopes are dissolved in a dilute acidic solution and adsorbed on the surface (optionally activated) of a $d^{10}$-metal whereby the isotopes are selectively desorbed by elution with an eluent in the presence of hydrogen.

Another aspect of the invention relates to the combined concentration and purification of radioisotopes. Accordingly, the invention relates to a process for the purification and concentration of radioisotopes wherein the isotopes are dissolved in a dilute acidic solution and adsorbed on the surface (optionally activated) of a $d^{10}$-metal whereby the isotopes are selectively desorbed by elution with an eluent in the presence of hydrogen.

In an preferred embodiment of the invention, the $d^{10}$-metal is platinum.

In a preferred embodiment of the invention the metal is positioned in a column, whereby the column is filled with the iodine absorbing metal. Any column, known in the art will suffice, such as a chromatography column, which can be a simple glass, metal or plastic column or tube of any size and diameter.

The metal can be in any suitable form, with or without a carrier material such as carbon, silica, alumina or other carrier materials which are itself known in the art. The form of the metal is not crucial, as long as the absorbing properties are suitable. In an embodiment of the invention the metal is in a form that allows for the formation of a column filled with the metal or metal-containing material. In a preferred embodiment, the metal is in the form of finely cut foil, sponge, powder or small particles, wherein the particle size of the metal ranges from 1 μm to 2 mm, preferably from 2 μm to 1.5 mm, more preferably from 5 μm to 1 mm. A preferred embodiment is one wherein the metal particles have a size in the area of 10 to 20 μm. Care should be taken that the metal particle size is selected such that the flow of the column is not blocked. When carrier materials are used, the size of the metal particles is not critical.

The surface of the metal which is used in the column may optionally be activated first by hydrogen. Thus, one embodiment of the invention is therefore one wherein the surface of the metal is activated by hydrogen, and another embodiment of the invention is one wherein the surface of the metal has not been activated.

The hydrogen optionally used to activate the surface of the metal is, in general, pure hydrogen. It is also possible to employ mixtures of inert gases with hydrogen, or solutions comprising hydrogen. It is another embodiment of the invention to generate hydrogen gas in situ, such as by the decomposition of formiate in $H_2$ and $CO_2$, which occurs at elevated temperatures, or by other compounds which, upon decomposition or otherwise, produce hydrogen or other compounds that activate the surface of the metal. It is therefore a preferred embodiment of the invention to activate the surface of the column by the decomposition of formiate.

The solution in which the isotopes are dissolved is an acidic solution. This can be any non-halogen containing acid such as nitric acid, sulphuric acid, phosphoric acid or other organic and inorganic acids, preferably sulphuric acid. An embodiment of the invention accordingly is one wherein the acidic solution is a sulphuric acid solution.

Elution of the column is accomplished by a basic solution, for instance an aqueous solution comprising hydroxide ions. The source of the hydroxide ions is not crucial, alkali hydroxides, earth alkali hydroxides and mixtures thereof can be used, preferably sodium or potassium hydroxide. In a preferred embodiment of the invention, the column is eluted with an aqueous solution of a hydroxide anion, wherein the alkaline solution has a concentration of $OH^-$ from $10^{-4}$ to 1 M, preferably $10^{-3}$–0.75 M, more preferably $5*10^{-2}$–0.5 M.

During optimisation it was found that a more optimal result was obtained by an alternating flux of the alkaline solution and hydrogen gas. By alternating elution of the column with a small volume of the alkaline solution and a small volume of hydrogen gas in a so-called 'train elution' the efficiency was significantly improved. Therefore, in a preferred embodiment, the column is eluted by an alternating flux of the alkaline solution and hydrogen gas.

In an alternative embodiment it is also possible to elute the column with a compound which can generate hydrogen in situ. An example thereof is formiate. In an embodiment of the invention, the eluent comprises a solution of formiate. In a preferred embodiment of the invention the column is eluted by a solution comprising formiate, preferably at elevated temperatures.

In alternative embodiment of the invention the column is eluted under non-aqueous conditions. Preferably the solvent used in the anhydrous elution allows for a basic environment and at the same time dissolves iodide.

In an embodiment of the invention the isotope is selected from I- and At-isotopes, preferably from iodine isotopes, more preferably from $^{121}I$, $^{123}I$, $^{125}I$, $^{131}I$, most preferable $^{123}I$ and $^{131}I$.

The iodine containing solution may also contain oxidation products of iodine. The oxygenated iodine products such as iodate and periodate are reduced in situ on the metal surface, thereby further improving the efficiency of the process of the purification of the iodine compounds.

The invention accordingly also relates to a process for the purification of solutions of iodine isotopes by the reduction of oxidised iodine containing compounds on an activated platinum, palladium or nickel metal, preferably platinum. The isolation can then be accomplished by selective eluting the reduced compounds. In an alternative embodiment the acidic solution therefore contains oxidised iodine compounds such as iodate or periodate. In an embodiment of the invention the metal has in situ reducing properties. The load solution which is generally directly obtained from the production step of radioactive iodine generally comprises the radioiodine and oxidised products of the radioiodine.

In another aspect the invention comprises a method for obtaining a concentrated and transportable form of radioisotopes whereby the iodine isotopes are absorbed on the column and eluted from the column prior to the use of the isotope. A preferred embodiment of the invention is therefore a kit comprising a column comprising platinum or palladium whereby an amount of iodine is absorbed on the metal and means for eluting said iodine. In this way it is possible to obtain the iodine free from oxidised products and ready for use.

The invention also comprises a process for the purification and concentration of radioiodine isotopes comprising the steps of:

a. optionally activating a platinum surface in a column with hydrogen gas, b. loading the column with an acidic radioiodine solution c. eluting the column.

The invention also comprises an apparatus for the purification of radioisotopes comprising a column, optional means for activating the metal, means for loading the column and means for eluting the column. In a preferred embodiment the invention comprises an apparatus for the purification of radioisotopes comprising a column, optional means for purging the column with hydrogen, means for loading the column, means for washing the column, means for eluting the column, means for collecting the eluted fraction and means for collecting waste.

The invention accordingly comprises a column comprising platinum and radioiodine, wherein the iodine is absorbed on the platinum and the invention also comprises a composition comprising platinum and iodine in a vessel suitable for storage and shipment.

The invention is now further illustrated by the following examples, which do not intend to limit the scope of the invention:

PRODUCTION OF RADIOIODINE

Figure 1:
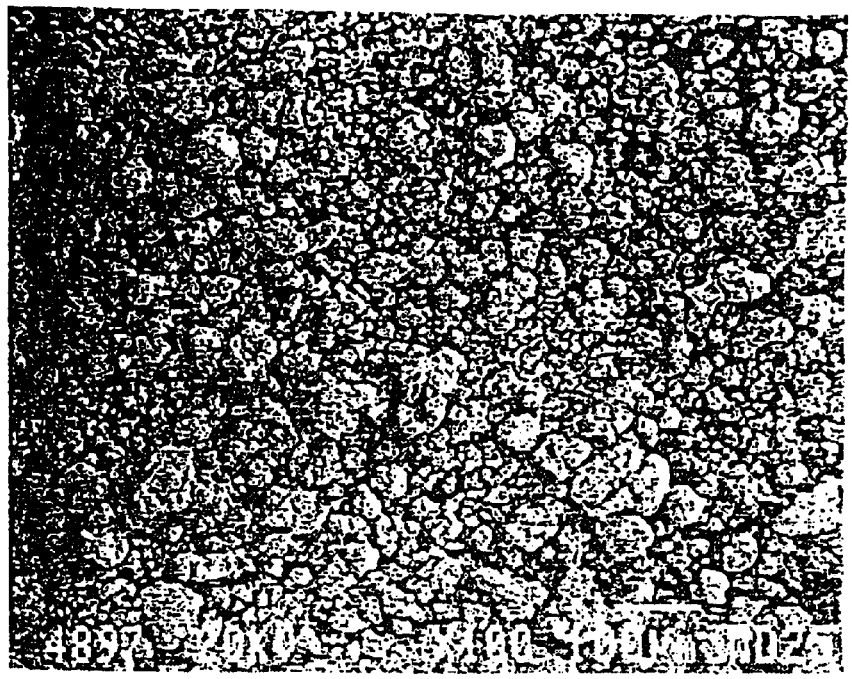
FIG. 1. Photographs of platinum powder and sponge.
Figure 1:
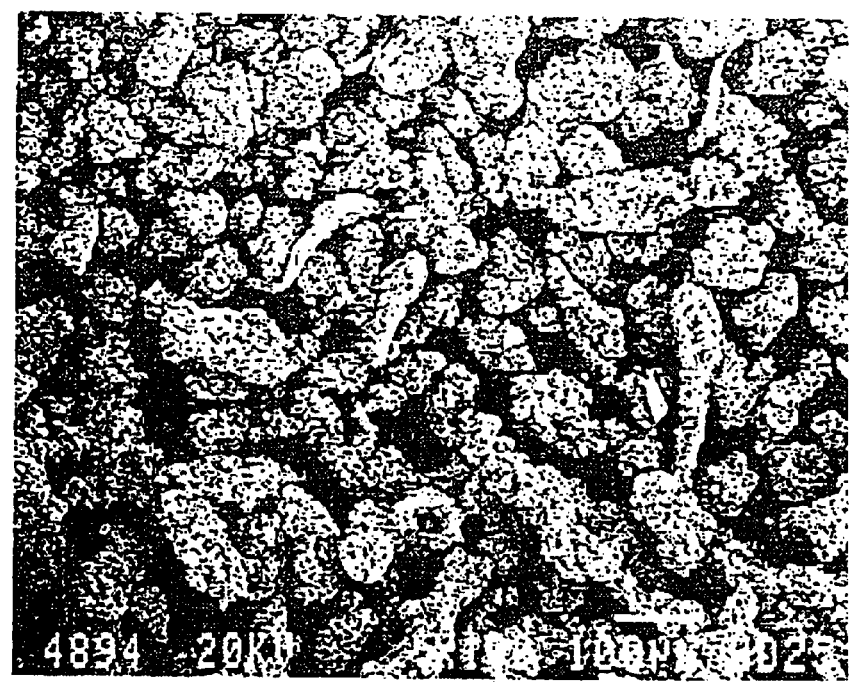

The iodine-123 which was used in the experiments came from the cyclotron department of the Free University of Amsterdam (Vrije Universiteit Amsterdam). This radioiodine solution was the first wash solution after stripping the iodine-123 bulk from the target chamber. The wash solution contained approximately 70 mCi iodine-123, 12 hours after the end the of bombardment, in 80 ml water with a pH of 6. A small amount (4–150 MBq) of the iodine-123 activity was used for spiking the load solution which was acidified with sulphuric acid. To correct for decay during the experiment, one or two reference iodine-123 solutions were prepared. This made it easier to calculate the yield directly after the experiment. The radioactivity was measured in a Veenstra dose calibrator type VDC 404. Each sample was measured in a plastic vial (10×70 mm) and to avoid problems with the geometry the volume of the measure sample was held on 1 ml. The tellurium-121 activity was measured on a Canberra S100 γ-spectrometer with a Ge(Li) crystal. The inactive iodide stock solution contained 17.5 mg potassium iodide in 250 ml 0.1 M sodium hydroxide. Ten microlitres correspond with 1 Ci iodine-123. To minimise iodine contamination and escaping volatile iodine, capsulated vials with a rubber stopper were used. All experiments were carried out with a self made low pressure liquid chromatography system without a pump. The whole system was under nitrogen to avoid oxidation of iodine. All connections between the column, valves and vials were made from Teflon tubing (id 0.5 mm). A drawn of the final production system is shown in FIG. 1. The radio chemical purity determination of iodine was done by a HPLC method. A LKB Pharmacia 2249 HPLC system was used with a on line LKB Pharmacia VWM 2147 wavelength detector set at 225 nm. The radioactivity was measured by a NaI flow detector from Ortec electronics. Both the wavelength and the radioactivity detector were connected to a personal computer were a software program (Workstation DS4000, version 5.0) transformed the data into a chromatogram. The column was a Merck Lichrosorb RP select B column (250*10 mm). The eluting buffers were a 0.002 M tetra butylammonium hydroxide+0.05 M sodium dihydrogen phosphate. The flow rate was 0.8 ml/min. and all analysis were carried out at 22 C. All chemicals used were of PA quality. Solutions were always made with oxygen free Milli-Q water. The used platinum black (cat.nr. 183000), sponge (20 mesh, cat.nr.00830) and powder (200 mesh, cat.nr. 2075) came from Johnson Matthey GmbH.

Adsorption of Iodine

Testing Different Platinum Powders.

Three different platinum powders were tested: black platinum, sponge (20 mesh) and fine powder (200 mesh). The following parameters were investigated: surface area (only 200 mesh powder), particle size distribution (only 200 mesh powder) It is important to make a good column with good flow properties. In the experiment the adsorption of iodide on the materials is tested. The solution used is a 0.5 M sulphuric acid solution which is spiked with iodide-123. The influence of the adsorption temperature was also tested.

The use of platinum black powder did not result in a useful adsorption. The small particles caused a high pressure in the system, thereby blocking the flow of the solution. Sponge platinum has a particle size which gives acceptable pressure in the system. Nine experiments with non-activated platinum resulted in a mean adsorption of 99%, identical to the result obtained with activated platinum.

TABLE 2

Different platinum powders.

| Platinum mesh powder | Volume ml | Temperature ° C. | Activity $^{123}$I μCi | Adsorption $^{123}$I % |
|---|---|---|---|---|
| 20 | 1 | 22 | 190 | >99 |
| 20 | 1.3 | 37 | 105 | >99 |
| 200 | 2 | 22 | 96 | >99 |
| 200 | 2 | 59 | 86 | >99 |

Figure 5:
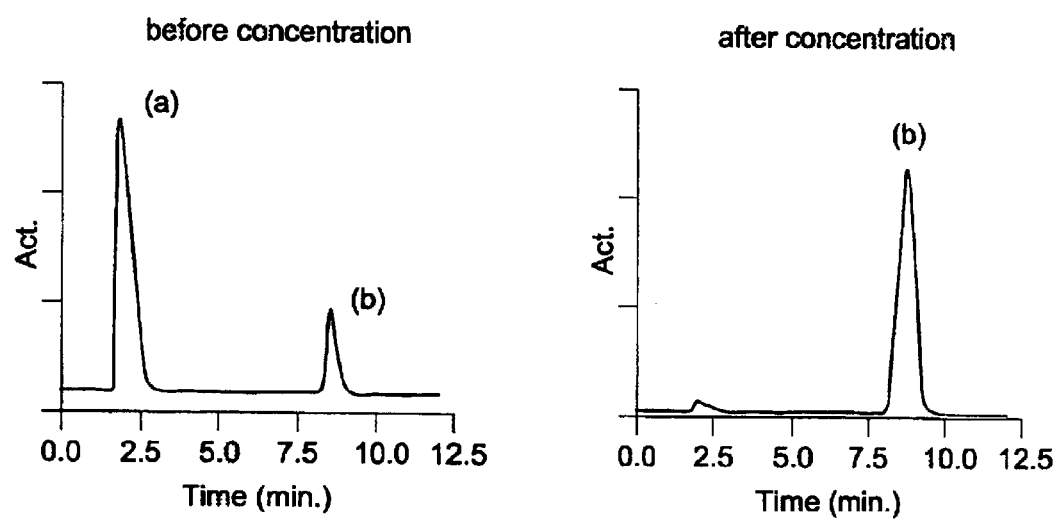
FIG. 5. HPLC chromatogram.

The surface area of the platinum powder <200 mesh is 0.3824 m²/g.(BET method). From the 20 and 200 mesh powders, Scanning Electron Microscope pictures were made with a 100 times magnification in FIG. 5. The surface area analysis and the electron microscope pictures were made at the Energy Research Foundation. The powder appears to be a crushed product from the sponge powder.

Neither the temperature nor the particle size of the platinum powder have any influence on the adsorption of the iodine.

The Influence of the pH of the Target Solution on the Iodine Adsorption.

The influence of the pH of the target solution on the iodine adsorption is determined. In this experiment the pH is increased from 1 to 12. The amount of inactive iodide in the load solution corresponds to 1 Ci.

It seems that the adsorption of iodine on platinum slowly decreases if the pH of the target solution comes above five. (see FIG. 2)

Capacity of the Column

In this experiment the capacity of the platinum column was investigated. The amount of platinum in the column was approximately 470 mg. The load volume was 30 ml; in the other experiments the volume was 100 ml.

TABLE 3

Capacity of the column.

| Inactive Iodide μg | simulate I-123 Ci | activity I-123 μCi | adsorption % |
|---|---|---|---|
| 0.5 | 1 | 281 | 99 |
| 1 | 2 | 400 | 99 |
| 2.5 | 5 | 628 | 99 |
| 7.5 | 15 | 1891 | 99 |
| 14.5 | 29 | 4150 | 99 |

The maximum capacity of the column has not been reached. The highest adsorbed amount of iodine tested so far, is 15 mg, which corresponds to 29 Ci iodine-123 (see Table 3). The 15 mg correspond to $7.10^{-11}$M iodine per cm² platinum surface.

Desorption of the Adsorbed Iodine

Desorption with Different Kinds of Chemicals.

Hydrogen gas is important for the desorption of iodine. In the next experiment, hydrogen gas and formiate are used in combination with sodium hydroxide. Formiate dissociates at temperatures higher than 70° C. in hydrogen and carbon dioxide.

TABLE 4

The effect of eluent composition on the yield.

| Platinum mesh | volume ml. | Temperature ° C. | Yield % | eluent composition |
|---|---|---|---|---|
| 20 | 2.0 | 22 | <0.5 | 0.1 M NaOH[a] |
| 20 | 2.0 | 22 | <0.1 | 0.1 M NaOH + sulfite |
| 20 | 1.0 | 22 | 94 | 0.1 M NaOH, $H_2$[b] |
| 20 | 2.0 | 37 | 94 | 0.1 M NaOH, $H_2$[b] |
| 20 | 1.2 | 70 | 78 | 0.5 M formiate |

[a]10 min. flushing with $H_2$, [b]In alternating flux of NaOH and $H_2$.

Flushing the column with hydrogen gas, followed by 0.1 M sodium hydroxide gives bad results even when sulfite is added to NaOH. Good yields are achieved when hydrogen gas is used in combination with 0.1 M sodium hydroxide (see Table 4). A remote control tree way valve combines a few ml hydrogen gas with a few ml diluted sodium hydroxide. This alternating liquid-gas supply gives very high yields. This alternating elution is called a "train elution" In the gas phase the interaction of platinum with iodine is weakened, which will subsequently result in the desorption of iodine by the alkaline solution. This desorption process is very efficient because there are many gas-liquid sequences. For this special elution procedure it is possible to use an electrical 3-way valve, in order to create quick alterations. The temperature of the column during the elution has no significant influence on the iodine-123 yield. The elution volume lies between 1 and 1.5 ml.

A normal elution with 0.5 M formiate at a column temperature of 70° C. gives a reasonable yield of 78%.

At this temperature the formiate dissociate on platinum in hydrogen gas and carbon dioxide. The generated hydrogen is responsible for the desorption of the adsorbed iodide.

Influence of the Molarity of the Sodium Hydroxide Solution on the Desorption of Iodine.

Figure 3:
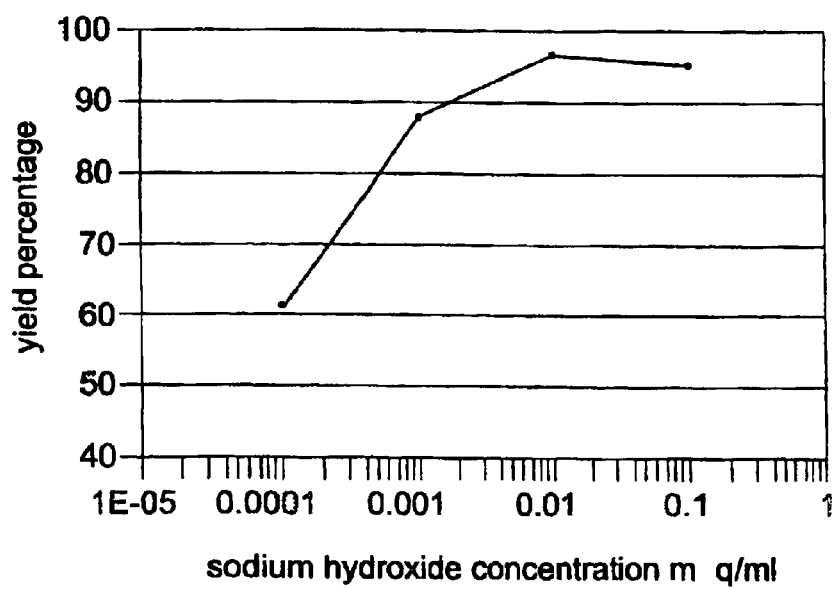
FIG. 3. Graph showing the influence of the sodium hydroxide concentration on the iodine-123 yield.

In this experiment the sodium hydroxide concentration ranged from 0.1 M to $10^{-4}$ M. FIG. 3 shows that a sodium hydroxide concentration lower than 0.01 M gives a significant decrease of the iodine-123 yield.

Reproducibility of the Iodine Desorption with 0.1 M Sodium Hydroxide Solution

To asses the reproducibility of the iodine desorption with 0.1 M sodium hydroxide in "train" with hydrogen gas, seven test productions were done. The conditions of the test productions are the same, 200 mesh platinum powder and the desorption temperature of the column is 55° C. Each production was carried out with non radio-active iodide equivalent to 1 Ci and spiked with iodide-123.

The mean iodine yield of seven productions was 95.3% with a standard deviation of 3.2%. Thus the desorption of iodine-123 under the above mentioned condition is reproducible.

Desorption of Iodine with Formiate

Earlier experiments showed that 78% iodine desorbs in 0.5 M formiate at a column temperature of 70° C. The same experiment was now carried out with a lower formiate concentration in a basic solution. The column temperature was 70 or 30° C.

The results are given in Table 6. It seems that a formiate concentration of 0.25 M in 0.05 M sodium hydroxide and a column temperature of 70° C. gives an iodine yield of 90%. The iodine yield at a column temperature of 30° C. is only 26%.

TABLE 6

Desorption by formiate.

| formiate-concentration M | NaOH-concentration M | Volume ml | Temperature ° C. | Yield % |
|---|---|---|---|---|
| 0.25 | 0.5 | 1.2 | 70 | 79 |
| 0.25 | 0.05 | 1.2 | 70 | 90 |
| 0.25 | 0.05 | 1.5 | 30 | 26 |

Reduction Capacity of the Platinum Column

The goal of this experiment was to determine the chemical form of the iodine in both the wash solution and the eluate after loading the column with oxidation products of iodine. One of the important labelling conditions is that the chemical form of eluted iodine is iodide, otherwise there is no labelling. With a HPLC method the chemical form of the iodine in the load, wash and eluate solution was determined. The iodide in the load solution is oxidized with 10 ml diluted hypochloric acid (10 ml 15% hypochloric acid in 10 ml water). After the experiment the chemical form of the iodine in the wash solution and eluate was also determined. The experiment was carried out at a pH where the adsorption is nearly 100% and at pH 6, this is the pH of the first wash solution of the target chamber.

TABLE 7

Reduction capacity of the column.

| | load solution | | waste solution | | eluate | | |
|---|---|---|---|---|---|---|---|
| pH | iodide % | oxidation products % | iodide % | oxidation products % | iodide % | oxidation products % | Yield % |
| 1 | 54 | 46 | 87 | 13 | 99 | nd | 90 |
| 1 | 16 | 84 | 47 | 53 | 97 | 3 | 90 |

TABLE 7-continued

Reduction capacity of the column.

| | load solution | | waste solution | | | eluate | |
|---|---|---|---|---|---|---|---|
| pH | iodide % | oxidation products % | iodide % | oxidation products % | io-dide % | oxidation products % | Yield % |
| 6 | 98 | 2 | 96 | 4 | 99 | nd | 81 |
| 6 | 24 | 76 | 22 | 78 | 99 | nd | 76 | nd: not determined.

The results are shown in Table 7. The total tellurium-121 percentage in the end product (1 ml) is 2.9% of the initial amount.

Best Production Procedure

NaI (Merck), NaBr (Merck), NaCl (Merck), $H_2SO_4$ (Baker), $TeO_2$ (Merck), NaOH (Baker), EtOH (pure, Riedel de Haen), citric acid (Merck), and oxalic acid (Merck) were analytical grade and used without purification.

Nitrogen and hydrogen-gas, with a purity of >99% were purchased from Hoekloos, The Netherlands.

Radioiodide ($Na^{123}I$, no-carrier-added) produced via a $^{124}Xe$ (p,2n)-nuclear reaction, was obtained from Mallinckrodt Medical, The Netherlands.

The platinum filled column, used for the adsorption of radioiodide was self-made. A Chrompack mini-column, 14×3 mm Ø, was filled dry with platinum sponge 0.6 mm (approx. 210 mg), which was obtained from Johnson Matthey GmbH.

Radioactivity was measured using a Veenstra dose calibrator, type VDC 404.

Control of the radiochemical purity of the radioiodide was performed by HPLC-analysis, using a RP Select B, 5µ-column, 125×4 mm (Merck). The eluent used was: 0.05 M $NaH_2PO_4$, 0.002 M tetrabutyl-ammoniumhydroxide, pH≈7, flow 0.8 ml/min.(Eersels et al., 1995). Peaks were detected by a flow-through radioactivity detector (Ortec) and a LKB VWM-2141 variable wavelength UV-monitor, at 220 nm. Chromatographic data were captured and analysed using a Nuclear Interface-software.

Radionuclidic purity was measured on a Canberra S100-gamma spectrometer with a Ge (Li)-crystal.

Figure 4:
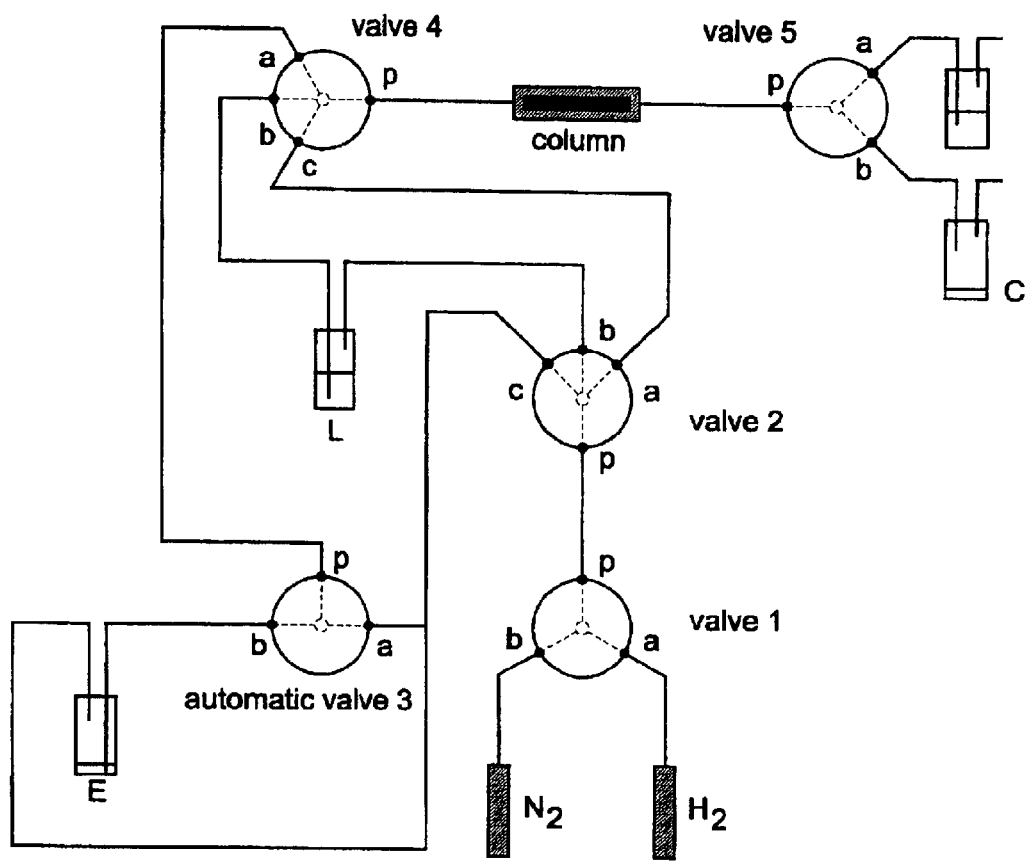
FIG. 4. Adsorption/desorption apparatus.

All the experiments were carried out with a self-developed low-pressure (3-4 bar) liquid system, depicted in FIG. 4. All connections, between column, valves and vials were made from PTFE-tubing (0.5 mm). The whole system is mounted on a panel, and is shut from air or oxygen. Liquids are purged through tubings, valves, and column only under nitrogen or hydrogen-gas.

PIXE (particle induced X-ray emission) measurements were performed as described by Vis et al. 1993, using 100 ppm yttrium as internal standard.

Control of traces of platinum, in the 1 ml concentrate, were done by ICP-AES; measurements were performed on axial plasma with 3 standards (Pt-ICP-standard: 100–1000 ppb).

Adsorption/desorption Procedure

The general procedure for the adsorption/desorption of the radioiodide takes place in 6 main steps, all executed at room-temperature (cf. FIG. 4):

(1) purge the system for 3 min. with $N_2$, (flow 5 ml/min.). Position valves: valve 1;b-p, valve 2;p-a, valve 4; c-p.

(2) activate the platinum filled column with $H_2$ during 2 min., (flow 5 ml/min.), purge again with $N_2$, during 1 min.

With $H_2$: valve 1;a-p, valve 2;p-a, valve 4;c-p.
With $N_2$: valve 1;b-p, valve 2;p-a, valve 4;c-p.

(3) load the column with radioiodide-solution, a 5 mM sulphuric acid (volume 5–50 ml), (flacon L-waste I), flow of 3–4 ml/min., with $N_2$.
Valve 1;b-p, valve 2;p-b, valve 4;b-p, valve 5;p-a.

(4) rinse the column with 5 ml water (flacon L-waste II), and purge the system dry with $N_2$. Rinsing: same position as loading, purging dry: valve 1;b-p, valve 2;p-a, valve 4;c-p.

(5) elute the 'adsorbed' radioiodide on the 'platinum' column with 1 ml $10^{-2}$ M NaOH and $H_2$, in a 'train', by means of a pneumatically-driven valve. The alkaline solution (flacon E) is purged through the column in micro-volumes of 50–100 µl, alternated with micro-volumes of $H_2$. Valve 1;a-p, valve 2;p-c, valve 3;a/b-p, valve 4;a-p, valve 5;p-b.

(6) rinse the column with 10 ml water (flacon L), and purge the system dry with $N_2$. Valve 1;b-p, valve 2; p-b, valve 4; b-p, valve 5;p-a.

Figure 2:
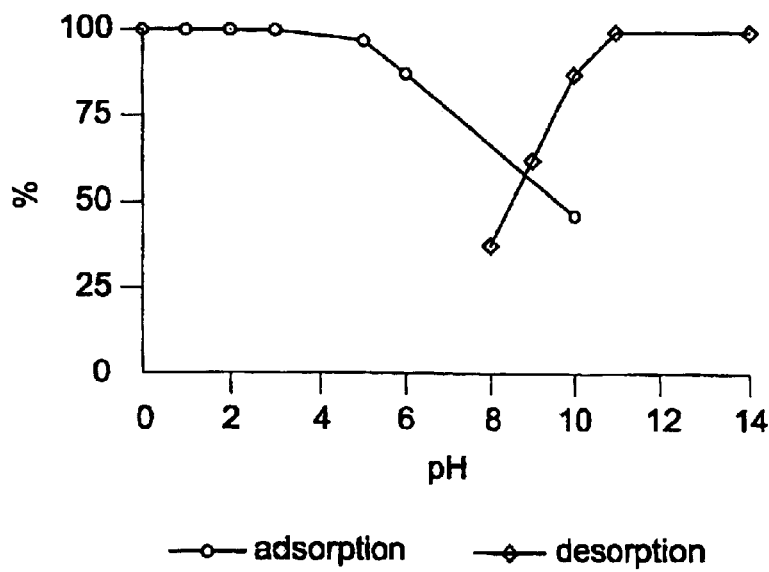
FIG. 2. Adsorption/description of iodine in correlation with pH.

With the use of platinum-powder, in a column-configuration and pre-treated with $H_2$; the radioiodide was quantitative >98% adsorbed (cf. FIG. 5), in a short time (few minutes). This in contrast with earlier described methods (Case et al., 1966, Kondo et al. 1977), where platinum-foil or felt, suspended in a radioiodide solution, resulted in a lower adsorption (≈80%), due to a slow adsorption-equilibrium process. In accordance, with previous findings, the adsorption of the radioiodide is optimal and reproducible when the metal is pre-treated with $H_2$ (Toth, 1963), whereas in case of no pre-treatment a lower adsorption was obtained ($\leq 70\%$). As shown in FIG. 2; in a sulphuric acid solution, optimum adsorption takes place in the pH-range 0–3.

By means of a remote controlled three-way valve, micro-volumes (50–100 µl) of $H_2$ and NaOH (0.1 M—total elution-volume 1 ml) were alternated purged through the column; a reproducible desorptions with yields up to 98–99% were achieved. As can be seen in FIG. 2, the desorption-degree is optimal from $10^{-2}$ M NaOH-solution.

TABLE 8

Adsorption/desorption of radioiodide.

| | | | | | |
|---|---|---|---|---|---|
| act. volume carrier | ≤37 MBq – 10 ml | 9.25 GBq – 30 ml | ≤37 MBq – 10 ml + 5 µg $Na^{127}I$ | ≤37 MBq – 10 ml + 15 µg $Na^{127}I$ | ≤37 MBq – 10 ml + 25 µg $Na^{127}I$ |
| Waste I | 0.6% | 1.5% | 0.6% | 0.8% | 8% |
| Waste II | ≤0.1 | ≤0.1 | ≤0.1 | ≤0.1 | 0.2 |
| Column | 0.3 | 0.4 | 0.3 | 0.3 | 0.3 |
| eluate (1 ml) | ≥99 | ≥98 | ≥99 | ≥98 | ≥91 |

Table 8 shows, with the standard conditions, as described in the adsorption/desorption procedure, the adsorption efficiency is independent of the amount radioactivity that is used: 37–9.250 MBq $^{123}I$. Addition of carrier $Na^{127}I$ (up to $10^{-7}$ mol or 15 µg, corresponding to 870 GBq $^{123}I$, or 60 GBq $^{131}I$) had no influence on the adsorption efficiency.

Under completely 'anhydrous' conditions, i.e. with 0.05M alkaline ethanol (1 ml), in combination with $H_2$-gas, the adsorbed radioiodide was eluted from the platinum-column. Reproducible recoveries up to 95–97% were obtained.

In all these experiments, analysis of radiochemical purity of the concentrate (1 ml-eluate) revealed a radiochemical purity of ≧99.8%. Traces of platinum could be found in the eluate, these were lower than 50 ppb (µg/l) or 0.05 µg/ml.

Adsorption/desorption Parameters

Optimum parameters of adsorption as well as desorption were investigated. On a 'reduced' platinum-column, the radioiodide was trapped from a sulphuric acid load-solution. Trapping efficiency was controlled with additional carrier $Na^{127}I$, and at varying pH-concentrations.

To get an impression of the desorption, the loaded column was purged with $H_2$ and afterwards with different volumes of varying concentrations of a sodium hydroxide-solution. Radiochemical purity of the eluted radioiodide was controlled.

With the use of platinum-powder, in a column-configuration and pretreated with $H_2$; the radioiodide was quantitative >98% adsorbed (cf. FIG. 5), in a short time (few minutes).

This in contrast with earlier described methods (Case et al., 1966, Kondo et al. 1977), where platinum-foil or felt, suspended in a radioiodide solution, resulted in a lower adsorption (≈80%), due to a slow adsorption-equilibrium process. In accordance, with previous findings, the adsorption of the radioiodide is optimal and reproducible when the metal is pre-treated with $H_2$ (Toth, 1963), whereas in case of no pre-treatment we became a lower adsorption (≦70%). As shown in FIG. 2; in a sulphuric acid solution, optimum adsorption takes place in the pH-range 0–3. Because the desorption of the radioiodide on platinum can be done electrochemically on the cathode (Toth, 1961), and in which by electrolysis $H_2$ is formed in situ, it was tried to desorb the radioiodide with a 0.5 M formiate-solution at elevated temperature (70° C.). A desorption of 75% was obtained, due to the generation of $H_2$ by catalytic decomposition of formiate in $CO_2$ and $H_2$, (Hudlicky, 1984).

By means of a remote controlled three-way valve, microvolumes (50–100 µl) of $H_2$ and NaOH (0.1 M—total elution-volume 1 ml) were alternated purged through the column; herewith reproducible desorptions up to 98–99% were achieved.

Table 8 shows, with the standard conditions, as described in the adsorption/desorption procedure, the adsorption efficiency is independent of the amount radioactivity that is used: 37–9.250 MBq $^{123}I$. Addition of carrier $Na^{127}I$ (up to $10^{-7}$ mol or 15 µg, corresponding to 870 GBq $^{123}I$, or 60 GBq $^{131}I$) had no influence on the adsorption efficiency. These results correspond with the reaction-mechanism proposed by Toth (1968) for the adsorption of radioiodide on 'reduced' platinum surface:

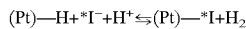

Due to the severe chemical conditions and subsequent low desorption (see infra), it can be concluded that the radioiodide is tightly bound to the metal-surface.

However, a simple combination of elution, alkaline-solution/$H_2$ in 'train', displaces the equilibrium of the reaction optimal to the left. Herein the alkaline species, the hydroxide-ion and $H_2$-gas are crucial. Under completely 'anhydrous' conditions, i.e. with 0.05M alkaline ethanol (1 ml), in combination with $H_2$-gas, we evacuated the adsorbed radioiodide from the platinum-column. Reproducible recoveries up to 95–97% were obtained.

In all these experiments: analysis of radiochemical purity of the concentrate (1 ml-elutate) revealed a radiochemical purity of ≧99.8%. Traces of platinum could be found in the eluate, these were lower than 50 ppb (µg/l) or 0.05 µg/ml.

in situ Reduction

Radiochemical impurities ($^*IO_3^-$) were induced by treating a radioiodide load-solution (10 ml, 5 mM $H_2SO_4$) with addition of a 10 µl diluted HOCl solution (50 µl 15% NaClO/10 ml $H_2O$). Radiochemical purity of the load-solution as well as eluate was controlled.

Reducing properties of $H_2$ are known, but in itself not particularly active. Instead, 'hydrogenised' or 'reduced' platinum, where the $H_2$-molecule is chemisorbed, its reducing properties are enhanced, (Mellor, 1961a), and as described by the same authors, the reduction of iodate to iodide is quantitative by hydrogen in presence of active platinum, (Mellor, 1961b).

As shown in FIG. 4, the reduction-capacity is excellent, in near fully 'oxidised' radioiodide, the eluate contained nearly 'pure radioiodide', while the recovery was acceptable (>90%).

Influence of Anions/cations

Anions:

Investigation of competition or disturbance in the adsorption-mechanism was done by addition of other halides; $Cl^-$ and $Br^-$-anions. Both experiments were carried out by adding radioiodide in a acidified (5 mM $H_2SO_4$) 10 ml $10^{-2}$M NaBr or NaCl-solution, separately. By means of PIXE, $Cl^-$ and $Br^-$-anions were traced in the alkaline-eluate. PIXE-analyses were executed in a non-radioactive simulation experiment.

Adsorption and desorption was not affected in the presence of the anions $Cl^-$ and $Br^-$. PIXE-analyses revealed traces of bromide (mean value 15 ppm) in the eluate, while traces of chloride-ions were 1–3 ppm. These results can be interpreted due to the intermediate-softness character of the bromide-ion versus chloride-ion, which is classified as hard ion, (Pearson, 1963).

Cations:

As cation $Te^{4+}$, (Te in form of Te or $TeO_2$) was used.

Two basic experiments were performed;

1. tracer quantities of Te: by means of $^{121}Te$ (a γ-emitter 573 keV, $t_{1/2}$ 16.8d.), a radioiodide load-solution was spiked with $^{121}Te$ (about 500–1000 Bq/ml).

2. preparative quantities of Te: simulation of an $^{124}I$-production. As starting material $TeO_2$ was taken. In view of its low solubility, even in acid solution, dissolution of 100 mg $TeO_2$ in 5 ml 1M NaOH was preferred.

Afterwards this solution was slowly added, to a 10 ml 1 M $H_2SO_4$-solution (final-pH about 0.8). The thus obtained tellurite-solution ($H_2TeO_3/HTeO_3^-$) was clear and ready to use.

Control of adsorption/desorption was done by spiking the solution with $^{123}I$.

Independent of the amount of tellurium, tracer or mass amounts, traces of 0–0.3% $^{121}Te$ of its total activity, in the 1 ml-eluate, were found. Recovery of radioiodide, were for both Te-experiments the same (>95%).

Concerning the activity-balance of $^{121}Te$; 80–85% could be traced in the waste-solution, while we noticed a rest-activity on the platinum-column of 15–20%. Addition of complexing agents, such as citric or oxalic acid had minor effects on the restactivity.

Cited Literature:

Acerbi E., Birattari C., Castiglioni M., Resmini F., and Villa M. (1975), Production of $^{123}I$ for medical purposes at the Milan AVF Cyclotron. Appl. Radiat. Isot. 26, 741–747.

Case F. N. and Acree E. H. (1966), Large-scale preparations of high purity $^{131}I$ and $^{133}Xe$ by sorption techniques. (U.S. Atomic Energy Commission report ORNL-3840.) U.S. Atomic Energy Commission, Washington, D.C.

Eersels J. L. H., Custers F. G. J., Ensing G. J., Herscheid J. D. M. (1995), A simple and efficient method to remove free radioiodide from *I-radiopharmaceuticals. E. J. Nucl. Med. 22, 1185–1186.

Good M. L., Purdy M. B., Hoering T. (1958), The anion-exchange separation of iodide-anions. J. Inorg. Nucl. Chem. 5, 73–75.

Harper P. V., Siemens W. D., Lathrops K. A. and Endlich H. (1963), Production and Use of iodine-125J. Nucl. Med. 4, 277,.

Hudlicky M. (1984), Reductions in Organic Chemistry, 13, (Ellis Horwood Limited).

Kondo K., Lambrecht R. M., Norton E. F., Wolf A. P. (1977), Cyclotron Isotopes and Radiopharmaceuticals—XXII. Improved Targetry and Radiochemistry for Production of $^{123}$I and $^{124}$I. Appl. Radiat. Isot. 28, 395–401.

(a) Mellor J. W. (1961), A Comprehensive Treatise on Inorganic Theoretical Chemistry, Vol. 1, 331–332, (Longmans Green and Co.).

(b) Mellor J. W. (1961), A Comprehensive Treatise on Inorganic Theoretical Chemistry, Vol. 2, 880–882, (Longmans Green and Co.).

Pearson R. G., (1963), Hard and Soft acids and bases. J. Am. Chem. Soc., 85, 3533.

Toth G. (1961), Production of carrier-free I-131 from telluric acid by an adsorption method. J. Inorg. Nucl. Chem. 19, 186–187.

Toth, G., (1963), "Adsorption of iodine, labeled with I-131 on platinum surface", Radiokhimiya, 5, 411–419.

Toth G. (1968), Untersuching der Jodadsorption an Palladiumoberflächen. IsotopenPraxis 4, 60–63.

Vis R. D., Kramer J. L. A. M., Tros G. J. H., van Langevelde F., Mars L., (1993), The upgraded Amsterdam nuclear microprobe. Nucl. Instr. Methods Phys. Res. B77:41.

Weinreich R., Knust E. J. (1996), Quality assurance of iodine-124 produced via the nuclear reaction $^{124}$Te(d,2n) $^{124}$I. J. Radioanal. Nucl. Chem., Letters 213, 253–261.

What is claimed is:

1. Process for the purification of radioisotopes wherein the isotopes are dissolved in a dilute acidic solution and adsorbed on the surface of a metal selected from the group consisting of platinum, palladium and nickel whereby the isotopes are selectively desorbed by elution with an eluent in the presence of hydrogen gas.

2. Process according to claim 1 wherein the surface of the metal is an activated surface.

3. Process according to claim 1 wherein the surface of the metal is not an activated surface.

4. Process for the concentration of radioisotopes wherein the isotopes are dissolved in a dilute acidic solution and adsorbed on the surface of a metal selected from the group consisting of platinum, palladium and nickel whereby the isotopes are selectively desorbed by elution with an eluent in the presence of hydrogen gas.

5. Process according to claim 4 wherein the surface of the metal is an activated surface.

6. Process according to claim 4 wherein the surface of the metal is not an activated surface.

7. Process for the purification and concentration of radioisotopes wherein the isotopes are dissolved in a dilute acidic solution and adsorbed on the surface of a metal selected from the group consisting of platinum, palladium and nickel whereby the isotopes are selectively desorbed by elution with an eluent in the presence of hydrogen gas.

8. Process according to claim 7 wherein the surface of the metal is an activated surface.

9. Process according to claim 7 wherein the surface of the metal is not an activated surface.

10. Process according to one of claims 1–9, wherein the metal is platinum.

11. Process according to claim 1, 4, or 7, wherein the particle size of the metal ranges from 1 $\mu$m to 1.5 mm, more preferably from 5 $\mu$m to 1 mm.

12. Process according to claim 2, 5, or 8, wherein the surface of the metal is activated by hydrogen.

13. Process according to claim 1, 4, or 7, wherein the acidic solution is a sulphuric acid solution.

14. Process according to claim 1, 4, or 7, wherein the eluent is an alkaline solution with a concentration of OH$^-$ from 10$^{-4}$M to 1M, preferably 10$^{-3}$M to 0.75M, more preferably 5*10$^{-2}$M to 0.5M.

15. Process according to claim 1, 4 or 7, wherein the process is carried out employing a column and wherein the column is eluted by an alternating flux of an alkaline solution and hydrogen gas.

16. Process according to claim 1, 4, or 7, wherein the eluent comprises a solution of formiate.

17. Process according to claim 1, 4, or 7, wherein the process is carried out employing a column and wherein the column is eluted by a solution comprising formiate, preferably at elevated temperatures.

18. Process according to claim 1, 4, or 7, wherein the isotope is selected from I- and At-isotopes.

19. Process according to claim 1, 4, or 7, wherein the isotope is selected from $^{123}$I and $^{131}$I.

20. Process for preparing a transportable form of a radioiodine isotope whereby the isotope is absorbed on a metal selected from the group consisting of platinum, palladium and nickel.

21. Process for the purification and concentration of radioiodine isotopes comprising the steps of:
   a. providing a platinum surface in a column;
   b. loading the column with an acidic radioiodine solution, and;
   c. eluting the column, providing that prior to step a there is a step of activating the platinum surface with hydrogen gas.

* * * * *